US012470022B2

(12) United States Patent
Patel et al.

(10) Patent No.: US 12,470,022 B2
(45) **Date of Patent: *Nov. 11, 2025**

(54) COMMUNICATION JACK HAVING A DIELECTRIC FILM BETWEEN PLUG INTERFACE CONTACTS

(71) Applicant: Panduit Corp., Tinley Park, IL (US)

(72) Inventors: Satish I. Patel, Roselle, IL (US); Roman J. Churnovic, Joliet, IL (US); Jean de Dieu Muntangana, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 393 days.

This patent is subject to a terminal disclaimer.

(21) Appl. No.: 17/517,022

(22) Filed: Nov. 2, 2021

(65) Prior Publication Data

US 2022/0059971 A1 Feb. 24, 2022

Related U.S. Application Data

(63) Continuation of application No. 16/730,281, filed on Dec. 30, 2019, now Pat. No. 11,165,202, which is a (Continued)

(51) Int. Cl.
*H01R 13/646* (2011.01)
*H01R 13/6461* (2011.01)
(Continued)

(52) U.S. Cl.
CPC ..... *H01R 13/6464* (2013.01); *H01R 13/6461* (2013.01); *H01R 13/6466* (2013.01); *H01R 13/6469* (2013.01); *H01R 24/64* (2013.01)

(58) Field of Classification Search
CPC ............ H01R 13/6464; H01R 13/6461; H01R 13/6466; H01R 13/6469; H01R 13/646; H01R 14/64
(Continued)

(56) References Cited

U.S. PATENT DOCUMENTS

| | | | |
|---|---|---|---|
| 5,547,405 | A | 8/1996 | Pinney et al. |
| 5,626,497 | A | 5/1997 | Bouchan et al. |

(Continued)

FOREIGN PATENT DOCUMENTS

| | | | |
|---|---|---|---|
| CN | 1120271 | A | 4/1996 |
| CN | 102124609 | A | 7/2011 |

(Continued)

*Primary Examiner* — Harshad C Patel

(74) *Attorney, Agent, or Firm* — Christopher K. Marlow; Christopher S. Clancy; James H. Williams

(57) ABSTRACT

Embodiments of the present invention relate to designs for network jacks which can be used for cable connectivity. In an embodiment, the present invention is an RJ45 jack that utilizes a thin dielectric film between two layers of PICs that provide crosstalk compensation by way of their geometry. Compensation is achieved by way of capacitor plates which sandwich a thin dielectric film. This allows for the layers of PICs to be in close proximity and achieve higher coupling where desired, allowing a greater amount of compensation to occur close to the plug/jack contact point. This can have the effect of moving compensation closer to the plug/jack contact point, which in turn may reduce the amount of compensation needed further along the data path.

1 Claim, 13 Drawing Sheets

Related U.S. Application Data continuation of application No. 16/032,665, filed on Jul. 11, 2018, now Pat. No. 10,522,947, which is a continuation of application No. 15/469,903, filed on Mar. 27, 2017, now Pat. No. 10,050,384, which is a continuation of application No. 15/097,553, filed on Apr. 13, 2016, now Pat. No. 9,634,433.

(51) Int. Cl.

| | |
|---|---|
| ***H01R 13/6464*** | (2011.01) |
| ***H01R 13/6466*** | (2011.01) |
| ***H01R 13/6469*** | (2011.01) |
| ***H01R 24/64*** | (2011.01) |

(58) Field of Classification Search
USPC .......................................................... 439/676
See application file for complete search history.

(56) References Cited

U.S. PATENT DOCUMENTS

| | | | |
|---|---|---|---|
| 5,769,647 | A | 6/1998 | Tulley et al. |
| 6,017,229 | A | 1/2000 | Tulley et al. |
| 6,042,427 | A | 3/2000 | Adriaenssens et al. |
| 6,176,742 | B1 * | 1/2001 | Arnett ................ H01R 13/6464 439/620.23 |
| 6,231,397 | B1 | 5/2001 | de la Borbolla et al. |
| 6,520,808 | B2 | 2/2003 | Forbes et al. |
| 7,601,034 | B1 | 10/2009 | Aekins et al. |
| 8,128,432 | B2 | 3/2012 | Jaouen et al. |
| 8,287,317 | B2 | 10/2012 | Straka et al. |
| 8,801,473 | B2 | 8/2014 | Fransen et al. |
| 9,634,433 | B1 * | 4/2017 | Patel ...................... H01R 24/64 |
| 10,050,384 | B2 * | 8/2018 | Patel .................. H01R 13/6466 |
| 10,522,947 | B2 * | 12/2019 | Patel .................. H01R 13/6464 |
| 11,165,202 | B2 * | 11/2021 | Patel .................. H01R 13/6464 |
| 2001/0021608 | A1 | 9/2001 | de la Borbolla et al. |
| 2008/0045090 | A1 * | 2/2008 | Caveney .............. H05K 1/0228 439/676 |
| 2013/0288538 | A1 | 10/2013 | Caveney et al. |
| 2014/0273638 | A1 | 9/2014 | Valenti et al. |

FOREIGN PATENT DOCUMENTS

| | | | |
|---|---|---|---|
| CN | 105247743 | A | 1/2016 |
| JP | 2932161 | B2 | 5/1999 |
| JP | 4944210 | B2 | 3/2012 |
| WO | 9515598 | A1 | 6/1995 |

* cited by examiner

COMMUNICATION JACK HAVING A DIELECTRIC FILM BETWEEN PLUG INTERFACE CONTACTS

CROSS-REFERENCE TO RELATED APPLICATIONS

This application is a continuation of U.S. patent application Ser. No. 16/730,281, filed Dec. 30, 2019, which issued as U.S. Pat. No. 11,165,202 on Nov. 2, 2021, which is a continuation of U.S. patent application Ser. No. 16/032,665, filed Jul. 11, 2018, which issued as U.S. Pat. No. 10,522,947 on Dec. 31, 2019; which is a continuation of U.S. patent application Ser. No. 15/469,903, filed Mar. 27, 2017, which issued as U.S. Pat. No. 10,050,384 on Aug. 14, 2018; which is a continuation of U.S. patent application Ser. No. 15/097,553 filed Apr. 13, 2016, which issued as U.S. Pat. No. 9,634,433 on Apr. 25, 2017; which is incorporated herein by reference in its entirety.

FIELD OF INVENTION

Embodiments of the present invention generally relate to the field of network communication, and more specifically, to designs for network jacks which can be used for cable connectivity.

BACKGROUND

It is known by those skilled in the art that network connectivity components such as RJ45 plugs and jacks produce and cancel, respectively, a predetermined amount of crosstalk. It is equally known that in order to more effectively cancel crosstalk within an RJ45 jack, compensation circuitry must be moved as close to the plug/jack mating interface as possible.

One method of achieving this is to use a flexible printed circuit board which is connected to plug interface contacts (PICs) of the jack at a point that is relatively close to the plug jack mating interface. An example of such configuration is provided in U.S. Patent Application Publication No. 2008/0045090 where FIGS. 15A-15G illustrate an exemplary jack which uses a flexible circuit board with crosstalk compensation circuitry thereon. While effective, this method is costly due to the high cost of flexible circuit boards.

Another method of moving crosstalk circuitry close to the plug/jack mating interface is to implement a crossover in some of the contact traces of the jack. An example of such a configuration can be seen in U.S. Patent Application Publication No. 2014/0073195 where crossovers in the PICs are implemented near the mandrel of the sled. Although these crossovers allow the compensation to begin relatively soon after the plug/jack mating interface, it is difficult to obtain a sufficiently desirable amount of coupling therefrom, causing a larger portion of the compensation signal to be generated further away from the plug/jack mating interface to achieve the net compensation signal.

In view of the foregoing, there remains a need for improved jack designs which provide appropriate crosstalk cancellation while remaining relatively economical to manufacture.

SUMMARY

Accordingly, at least some embodiments of the present invention are directed towards improved jack designs which provide appropriate crosstalk cancellation while remaining relatively economical.

In an embodiment, the present invention is an RJ45 jack that utilizes a thin dielectric film between two layers of PICs that provide crosstalk compensation by way of their geometry. Compensation is achieved by way of capacitor plates which sandwich a thin dielectric film. This allows for the layers of PICs to be in close proximity and achieve higher coupling where desired, allowing a greater amount of compensation to occur close to the plug/jack contact point. This can have the effect of moving compensation closer to the plug/jack contact point, which in turn may reduce the amount of compensation and/or crosstalk needed further along the data path.

In another embodiment, the present invention is a communication jack for mating with a communication plug. The communication jack includes a housing having an aperture for receiving the communication plug, a sled positioned at least partially inside the housing, a first end of the sled being proximate the aperture and having a mandrel, a second end being distal the aperture, a first PICs, each of the first plurality of PICs having a first section extending along a side of the sled and a second section formed around the mandrel, a second plurality of PICs, each of the second plurality of PICs having a first section extending along the side of the sled and a second section formed around the mandrel, and a dielectric film positioned between at least some of the first sections of the first plurality of PICs and at least some of the first sections of the second plurality of PICs, the dielectric film being further positioned between at least some of the second sections of the first plurality of PICs and at least some of the second sections of the second plurality of PICs.

In yet another embodiment, the present invention is a communication jack for mating with a communication plug. The communication jack includes a housing having an aperture for receiving the communication plug, the housing further having a plurality of crush ribs, a sled positioned at least partially inside the housing, a first end of the sled being proximate the aperture and having a mandrel, a second end being distal the aperture, a first plurality of PICs, each of the first plurality of PICs having a first section extending along a side of the sled and a second section formed around the mandrel, a second plurality of PICs, each of the second plurality of PICs having a first section extending along the side of the sled and a second section formed around the mandrel, and a dielectric film positioned between at least some of the first sections of the first plurality of PICs and at least some of the first sections of the second plurality of PICs, wherein the crush ribs compress at least some of the first plurality of PICs against the dielectric film.

In still yet another embodiment, the present invention is a communication jack for mating with a communication plug. The communication jack includes a housing having an aperture for receiving the communication plug, a sled positioned at least partially inside the housing, a first end of the sled being proximate the aperture and having a mandrel, a second end being distal the aperture, a first plurality of PICs, each of the first plurality of PICs having a first section extending along a side of the sled and a second section formed around the mandrel, a second plurality of PICs, each of the second plurality of PICs having a first section extending along the side of the sled and a second section formed around the mandrel, and a dielectric film positioned between at least some of the first sections of the first plurality of PICs and at least some of the first sections of the second plurality of PICs, wherein at least one of the first plurality of PICs capacitively couples to at least one of the second plurality of PICs via a first capacitive plate positioned on the at least one of the first plurality of PICs and a second capacitive plate positioned on the at least one of the second plurality of PICs, and wherein the first capacitive plate overlaps and extends over the second capacitive plate.

These and other features, aspects, and advantages of the present invention will become better understood with reference to the following drawings, description, and any claims that may follow.

DETAILED DESCRIPTION

Figure 1:
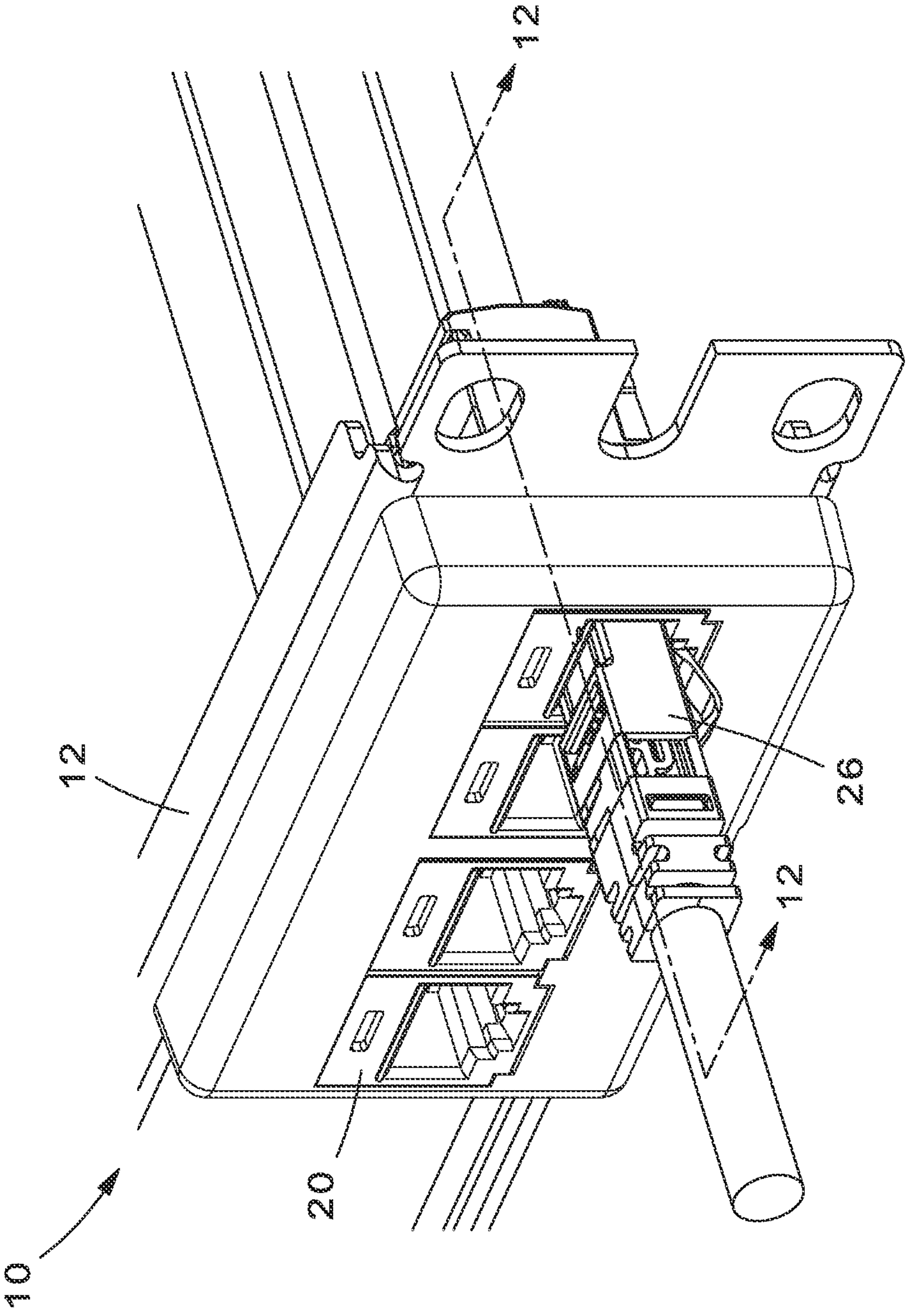
FIG. 1 is a top isometric view of a communication system according to an embodiment of the present invention.

An exemplary embodiment of the present invention is illustrated in FIG. 1, which shows a communication system 10, which includes a patch panel 12 with jacks 20 and corresponding RJ45 plugs 26. Once a plug 26 mates with a jack 20 data can flow in both directions through these connectors. Although the communication system 10 is illustrated in FIG. 1 as having a patch panel, alternative embodiments can include other active or passive equipment. Examples of passive equipment can be, but are not limited to, modular patch panels, punch-down patch panels, coupler patch panels, wall jacks, etc. Examples of active equipment can be, but are not limited to, Ethernet switches, routers, servers, physical layer management systems, and power-over-Ethernet equipment as can be found in data centers and or telecommunications rooms; security devices (cameras and other sensors, etc.) and door access equipment; and telephones, computers, fax machines, printers, and other peripherals as can be found in workstation areas. Communication system 10 can further include cabinets, racks, cable management and overhead routing systems, and other such equipment.

Figure 2:
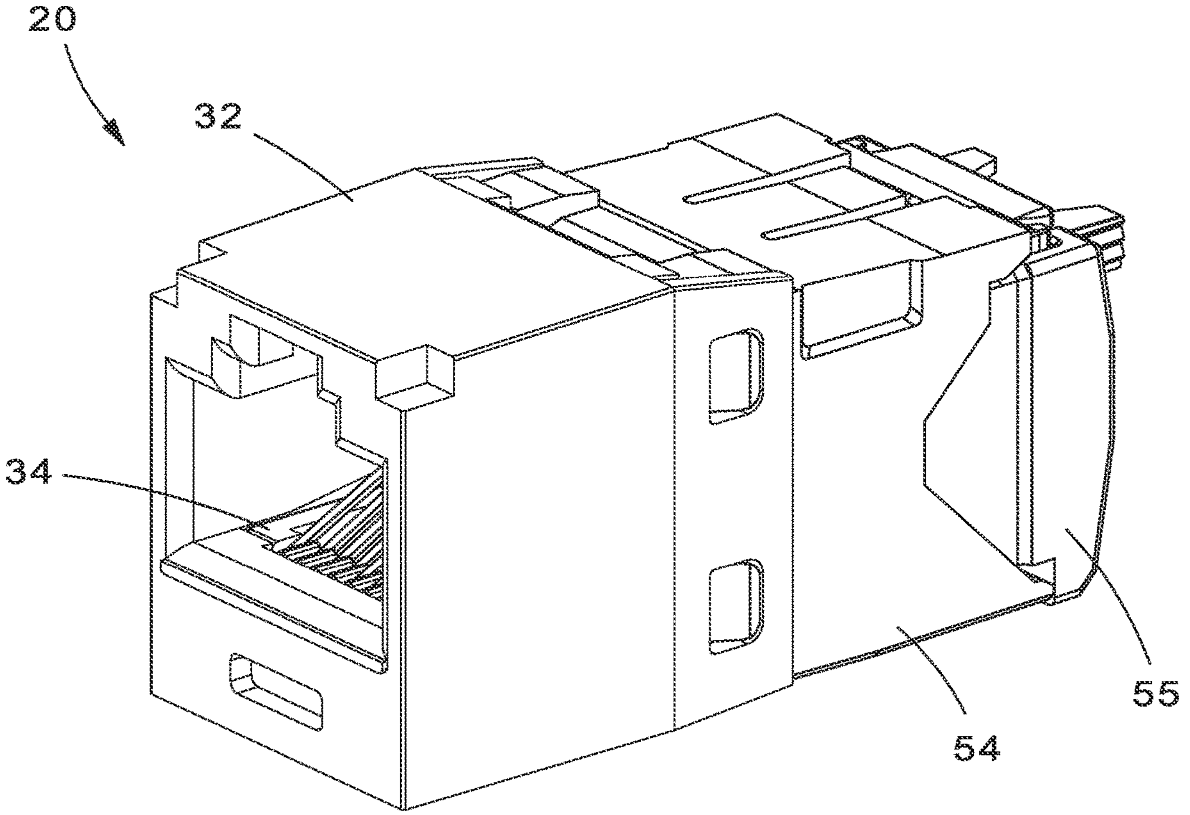
FIG. 2 is a bottom isometric view of a jack according to an embodiment of the present invention.
Figure 3:
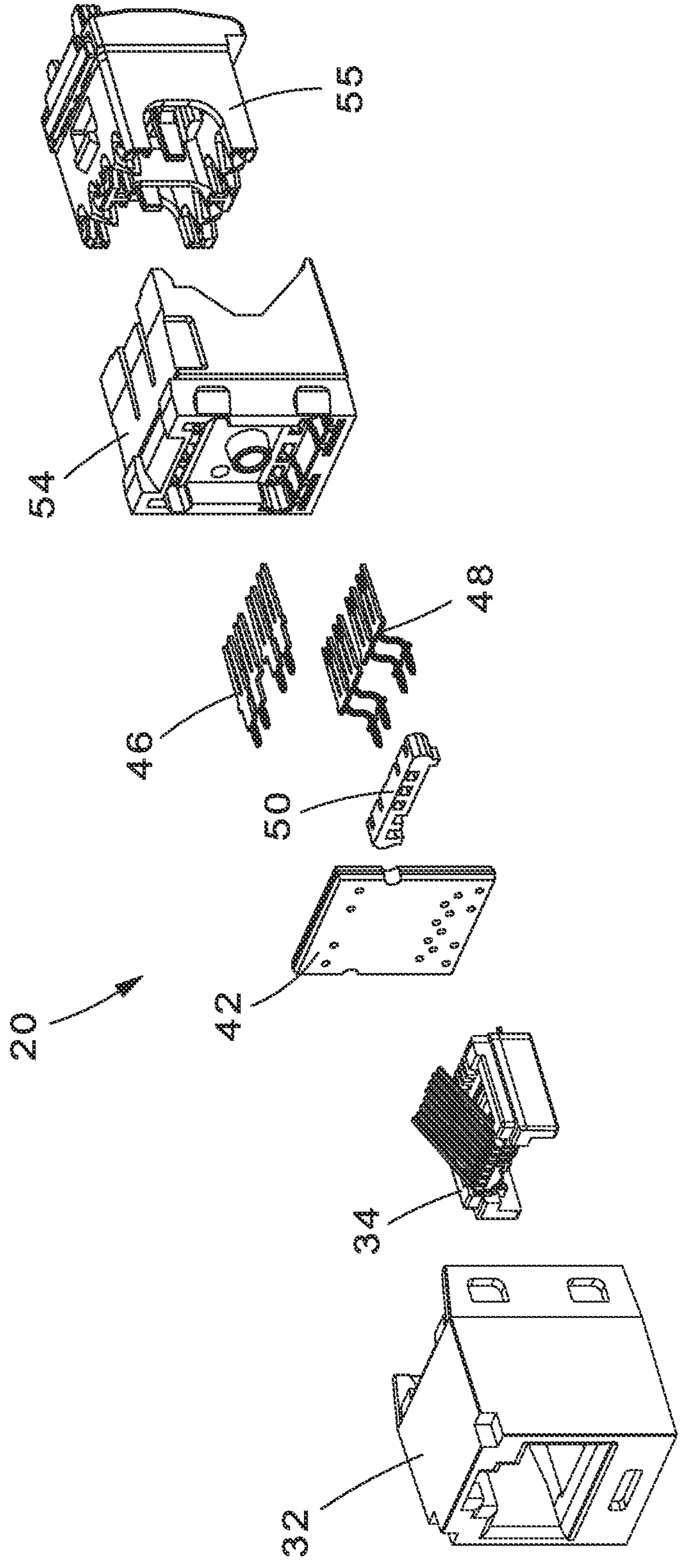
FIG. 3 is an exploded bottom isometric view of a jack according to an embodiment of the present invention.
Figure 4:
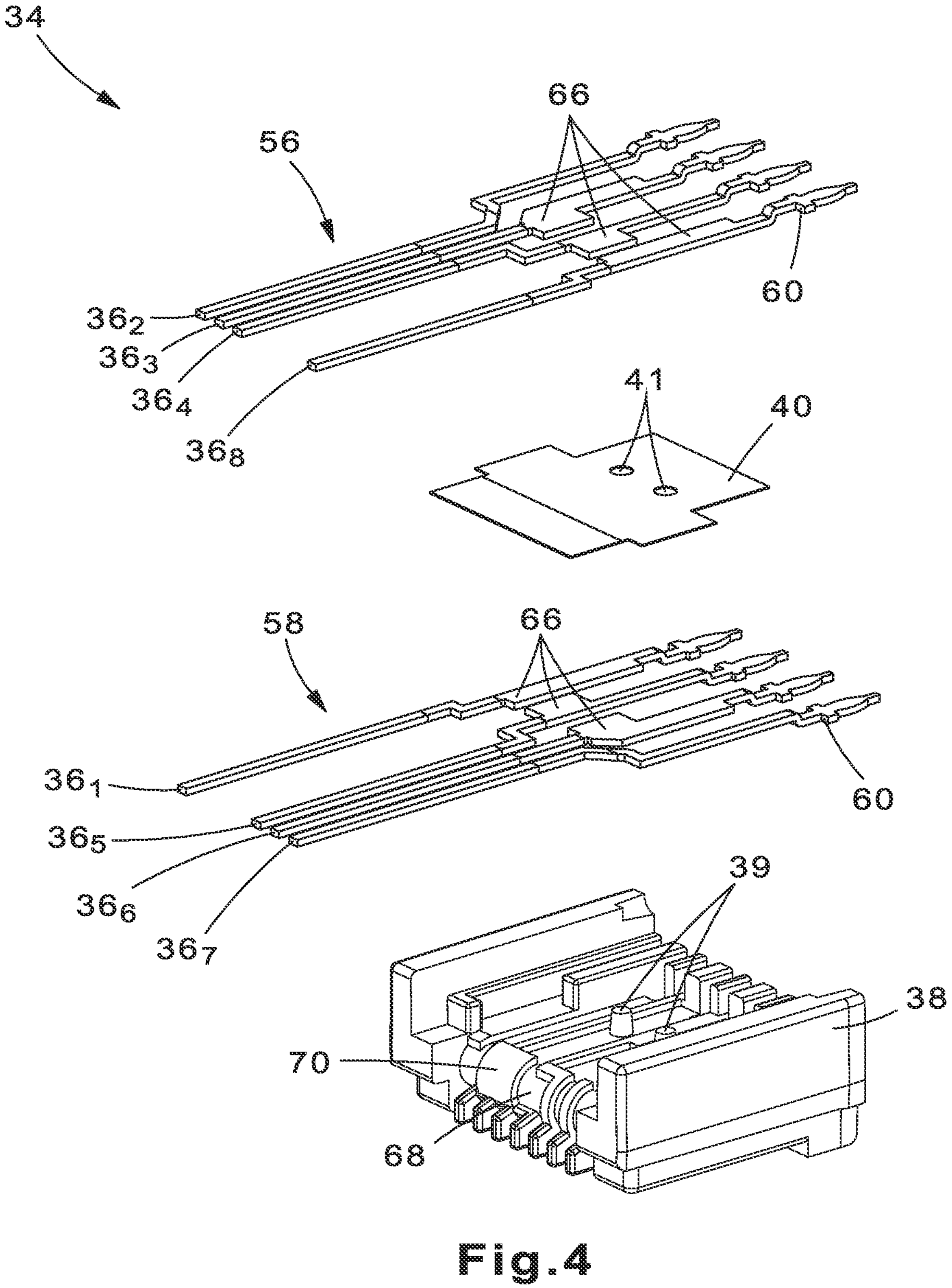
FIG. 4 is an exploded front top isometric view of a sled assembly according to an embodiment of the present invention.
Figure 5:
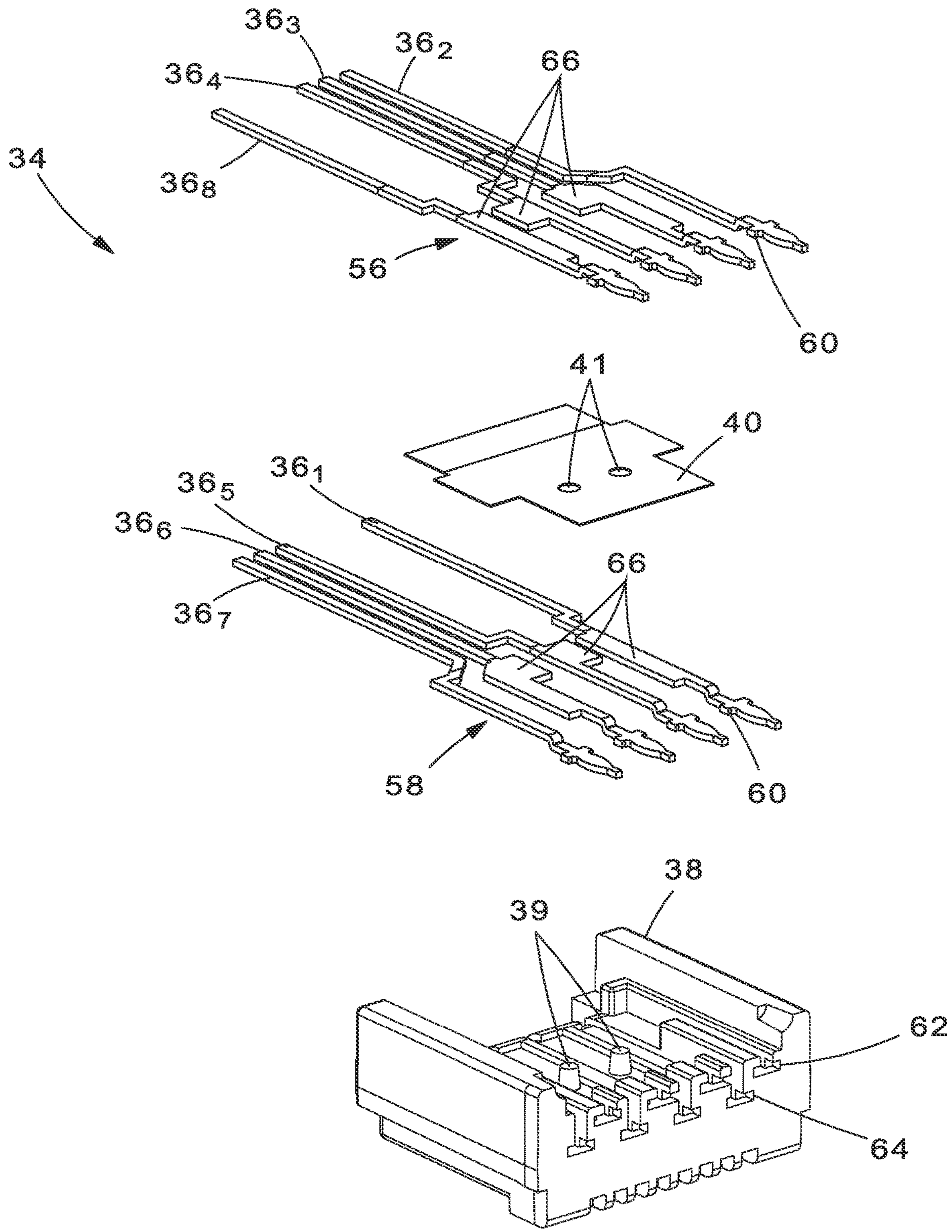
FIG. 5 is an exploded rear top isometric view the sled assembly of FIG. 4.

FIGS. 2 and 3 illustrate jack 20 in greater detail. As shown therein, it includes front housing 32, sled assembly 34, printed circuit board (PCB) 42, insulation displacement contacts (IDCs) 46 and 48, IDC support 50, rear housing 54, and wire cap 55. Referring to FIGS. 4 and 5, sled assembly 34 includes an upper PIC layer 56 comprised of PICs $\mathbf{36}_2$, $\mathbf{36}_3$, $\mathbf{36}_4$, and $\mathbf{36}_8$, a lower PIC layer 58 comprised of PICs $\mathbf{36}_1$, $\mathbf{36}_5$, $\mathbf{36}_6$, and $\mathbf{36}_7$, sled 38, and thin dielectric film 40. The subscript numbers of PICs represent RJ45 pin positions as defined by ANSI/TIA-568-C.2.

During assembly of sled assembly 34, PICs $\mathbf{36}_1$, $\mathbf{36}_5$, $\mathbf{36}_6$, and $\mathbf{36}_7$ of lower PIC layer 58 are placed into respective PICs slots on sled 38 with shoulders 60 on PICs $\mathbf{36}_1$, $\mathbf{36}_5$, $\mathbf{36}_6$, and $\mathbf{36}_7$ being placed into lower PIC locating slots 64. When in position, these PICs are formed over the smaller mandrel 68 of sled 38. A thin dielectric film 40 is placed onto the lower PIC layer 58 with guide holes 41 on dielectric film 40 aligning with guide posts 39 on sled 38. Next, PICs $\mathbf{36}_2$, $\mathbf{36}_3$, $\mathbf{36}_4$, and $\mathbf{36}_8$ of upper PIC layer 56 are placed into respective PICs slots on sled 38 with shoulders 60 on PICs $\mathbf{36}_2$, $\mathbf{36}_3$, $\mathbf{36}_4$, and $\mathbf{36}_8$ being placed into upper PIC locating slots 62. When in position, these PICs are formed over the larger mandrel 70 of sled 38 trapping the dielectric film 40 between the upper and lower PIC layers. Note that PICs 36 may be formed around the mandrels immediately as they are placed into their respective positions on sled 38 or they may be formed after both the upper and lower layers have been positioned accordingly.

Using the dielectric film 40 allows capacitance plates 66 of upper PIC layer 56 and lower PIC layer 58 to be positioned within approximately 0.002 inch of each other. This can enable greater and/or more precise amount of capacitive and inductive compensative coupling between the two PIC layers while maintaining a barrier therebetween. In the embodiment shown, upper PIC layer 56 and lower PIC layer 58 are a mirror image of each other. This can allow for the use of a single metal stamping process, potentially reducing the overall cost.

Figure 6:
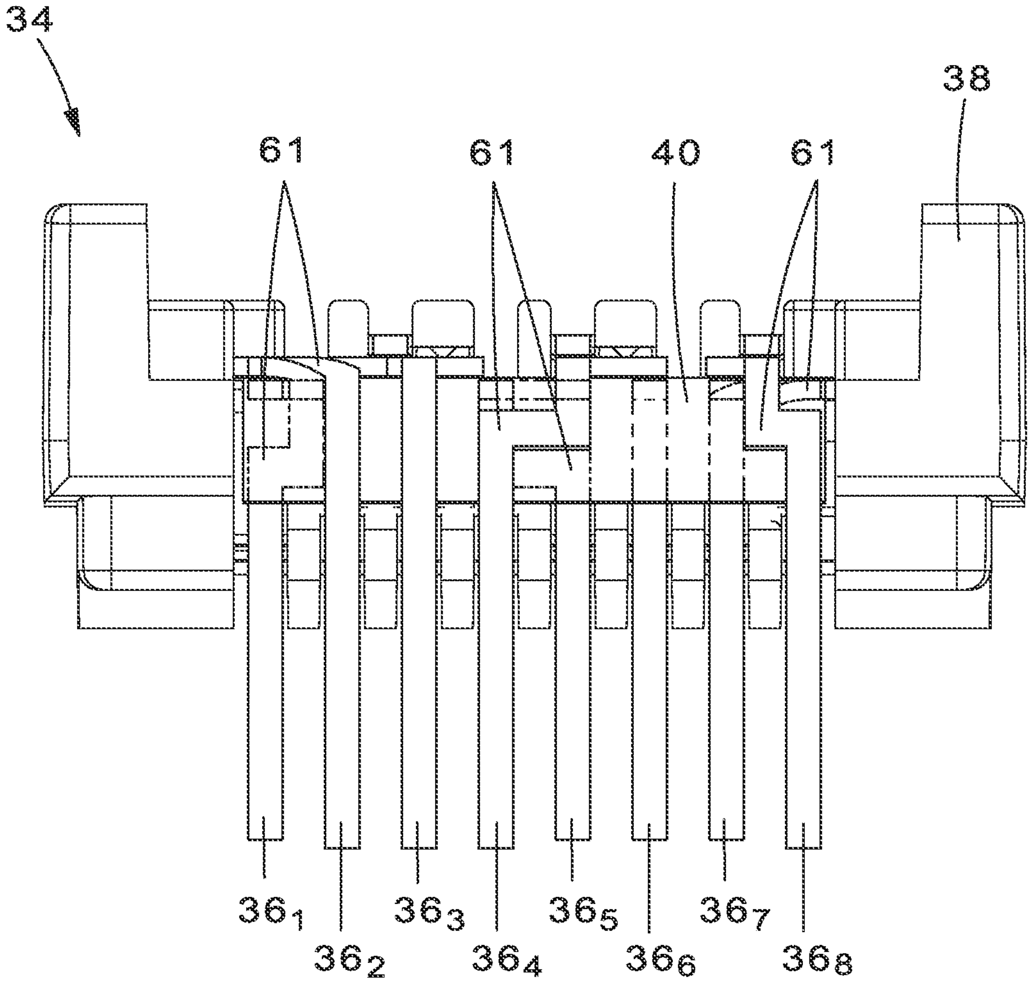
FIG. 6 is a partially transparent front view of the sled assembly of FIG. 4.
Figure 7A:
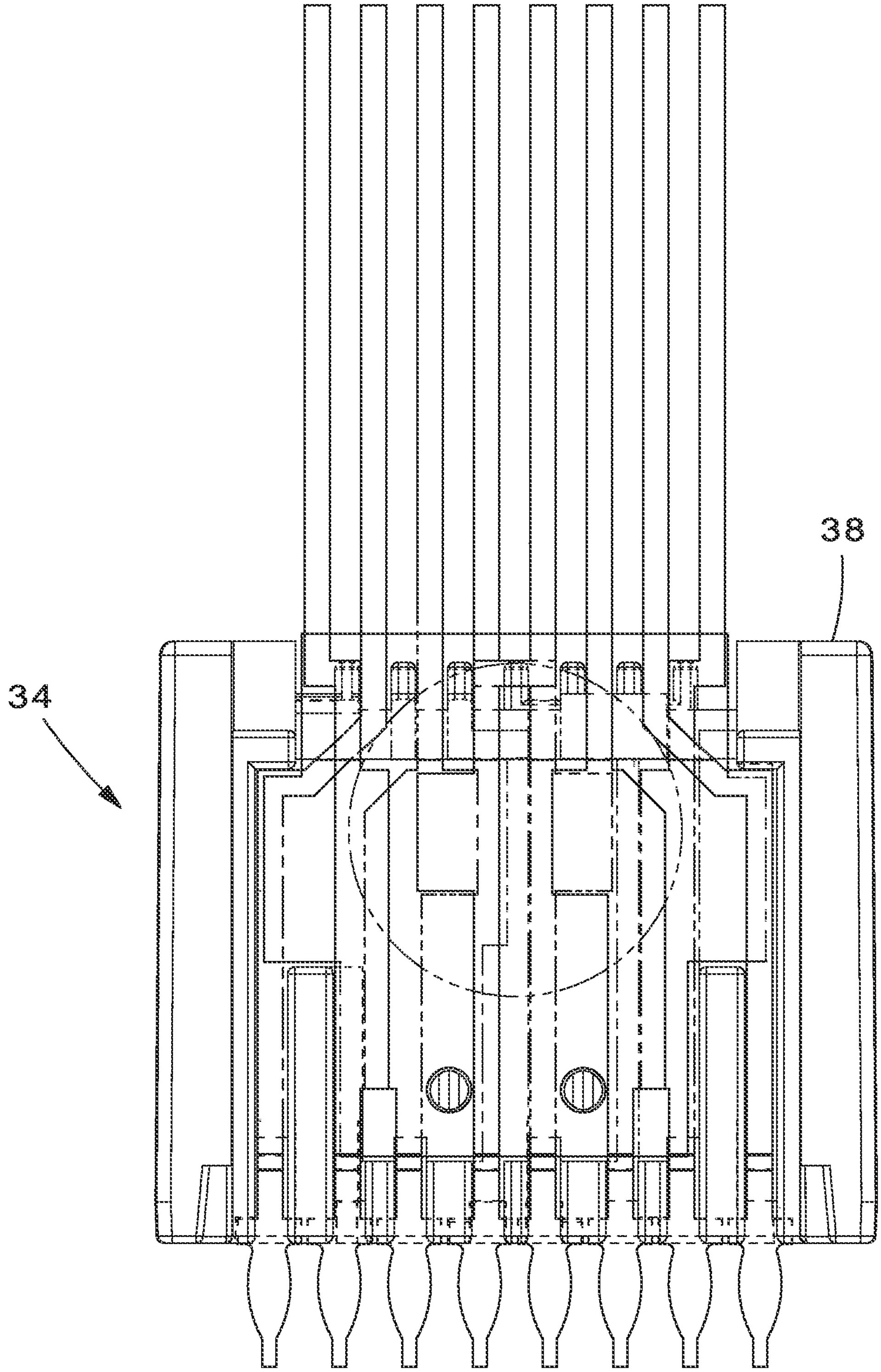
FIG. 7A is a partially transparent top view of the sled assembly of FIG. 4.
Figure 7B:
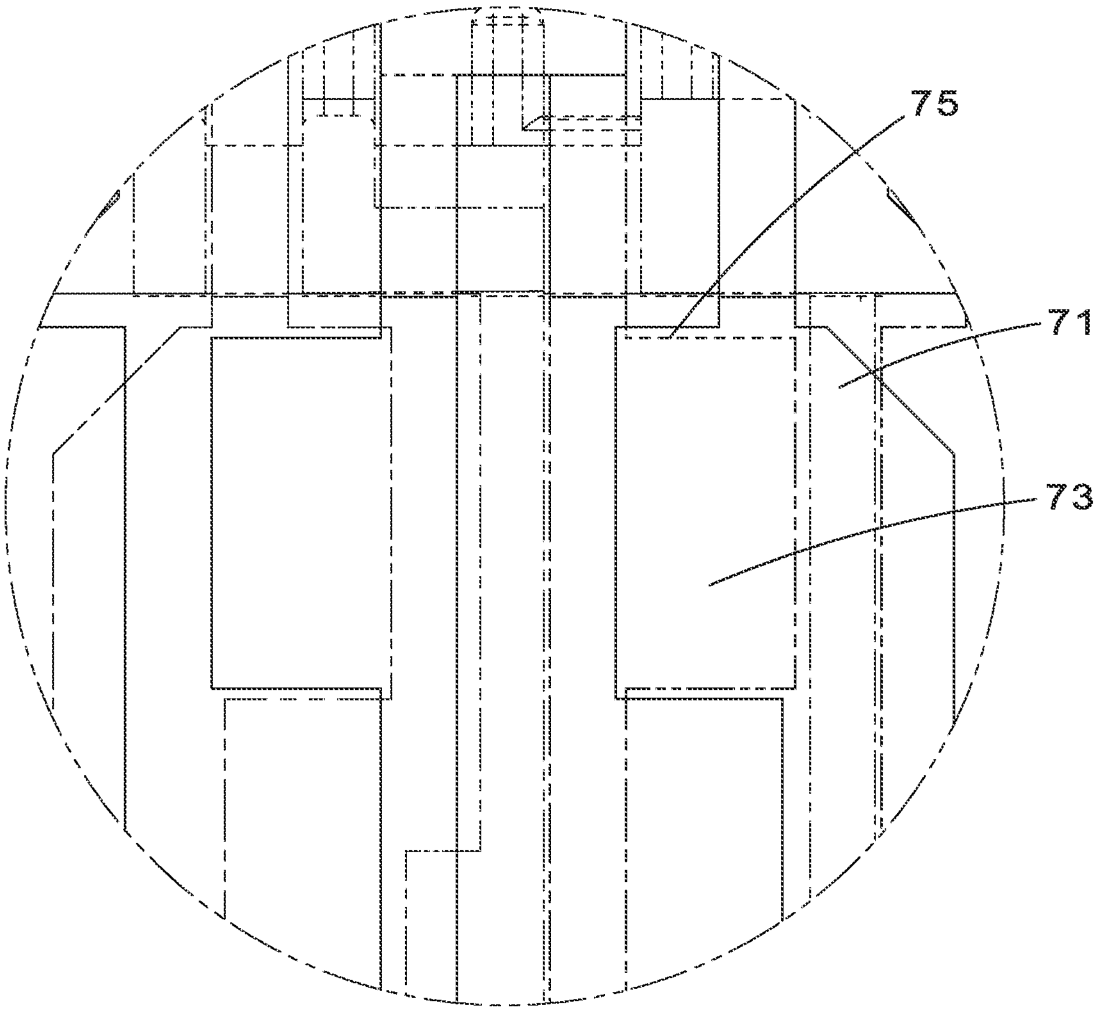
FIG. 7B is a detailed view from FIG. 7A.

FIG. 6 shows a partially transparent front view of front sled assembly 34 with PICs 36 formed around PIC mandrels 68 and 70. Crossover geometry 61 between PICs $\mathbf{36}_1$ & $\mathbf{36}_2$, $\mathbf{36}_4$ & $\mathbf{36}_5$, and $\mathbf{36}_7$ & $\mathbf{36}_8$ signifies the beginning of the crosstalk cancellation circuitry and thus reduces the amount of offending crosstalk produced in PICs 36. Extending dielectric film 40 into the crossover areas 61 permits the upper and lower PICs to be positioned closer than they would be otherwise, allowing more accurate compensation to occur closer to the plug/jack mating point. The crosstalk cancellation circuitry is shown more clearly in FIG. 7A which shows a partially transparent top view of the sled assembly 34 and FIG. 7B which shows a detailed view from FIG. 7A. Note that in FIG. 7A, PICs 36 are shown as being extended and not yet formed around the mandrels 68 and 70.

To achieve the desired capacitive coupling more precisely, at least some capacitive plates are oversized relative to their corresponding plates. An example of this is illustrated in the detailed view of FIG. 7B where plate 71 overlaps plate 73 and extends over it by a distance 75 that is at least 0.001 inches. Implementing such a configuration can allow for maintaining appropriate levels of capacitive coupling while sustaining manufacturing variances which would cause either plate 71 or 73 to be out of exact position. For instance, if distance 75 is 0.005 inches and plate 73 is skewed by 0.002 inches, the overlapping area between the two plates 71 and 73 remains the same, causing the capacitive coupling to remain the same. In an embodiment, distance 75 extends entirely around a given capacitor plate.

Figure 8:
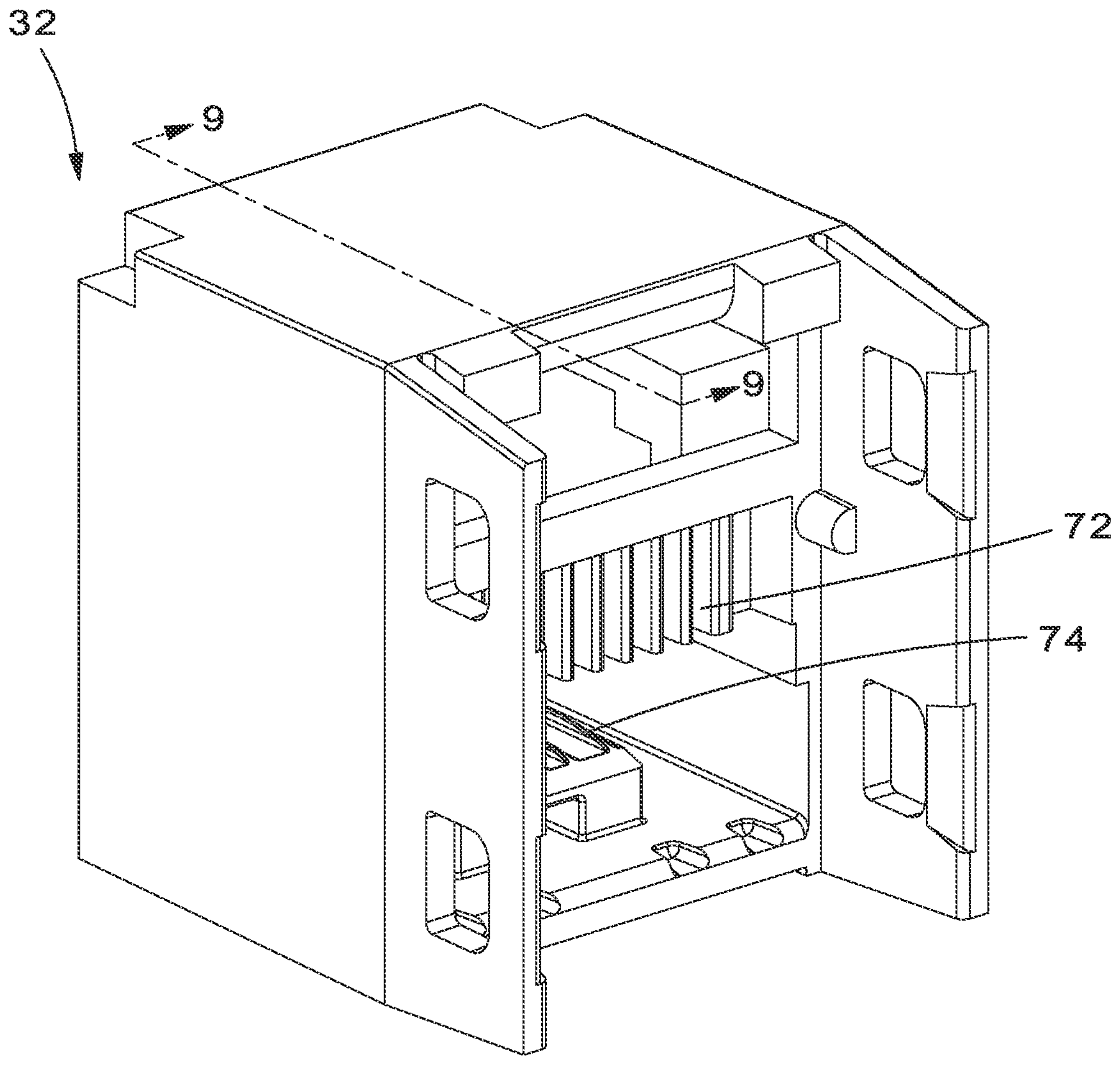
FIG. 8 is a rear bottom isometric view of a front housing according to an embodiment of the present invention.
Figure 9:
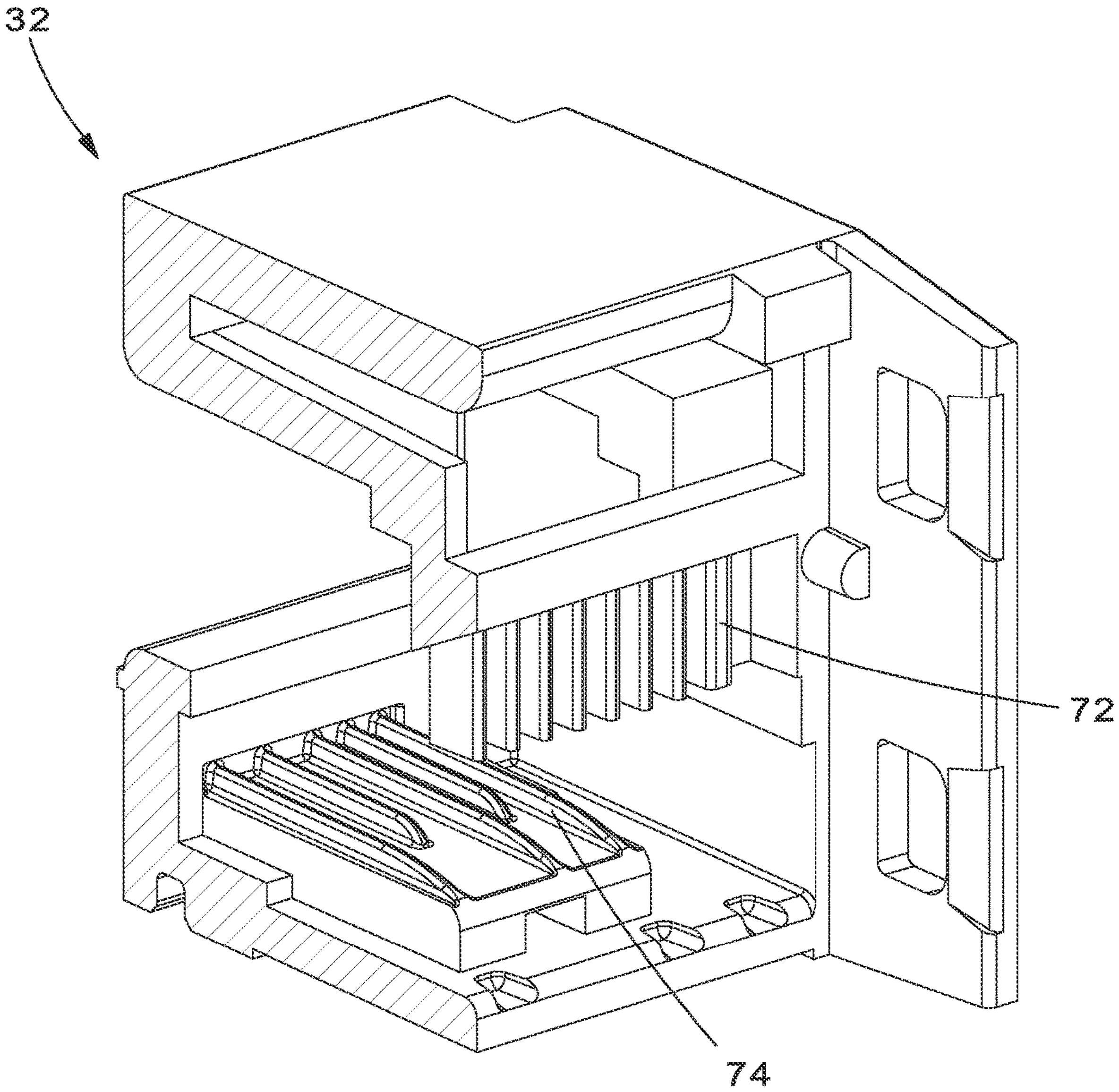
FIG. 9 shows an isometric cross-section view of the front housing of FIG. 8 taken about section line 9-9.
Figure 10:
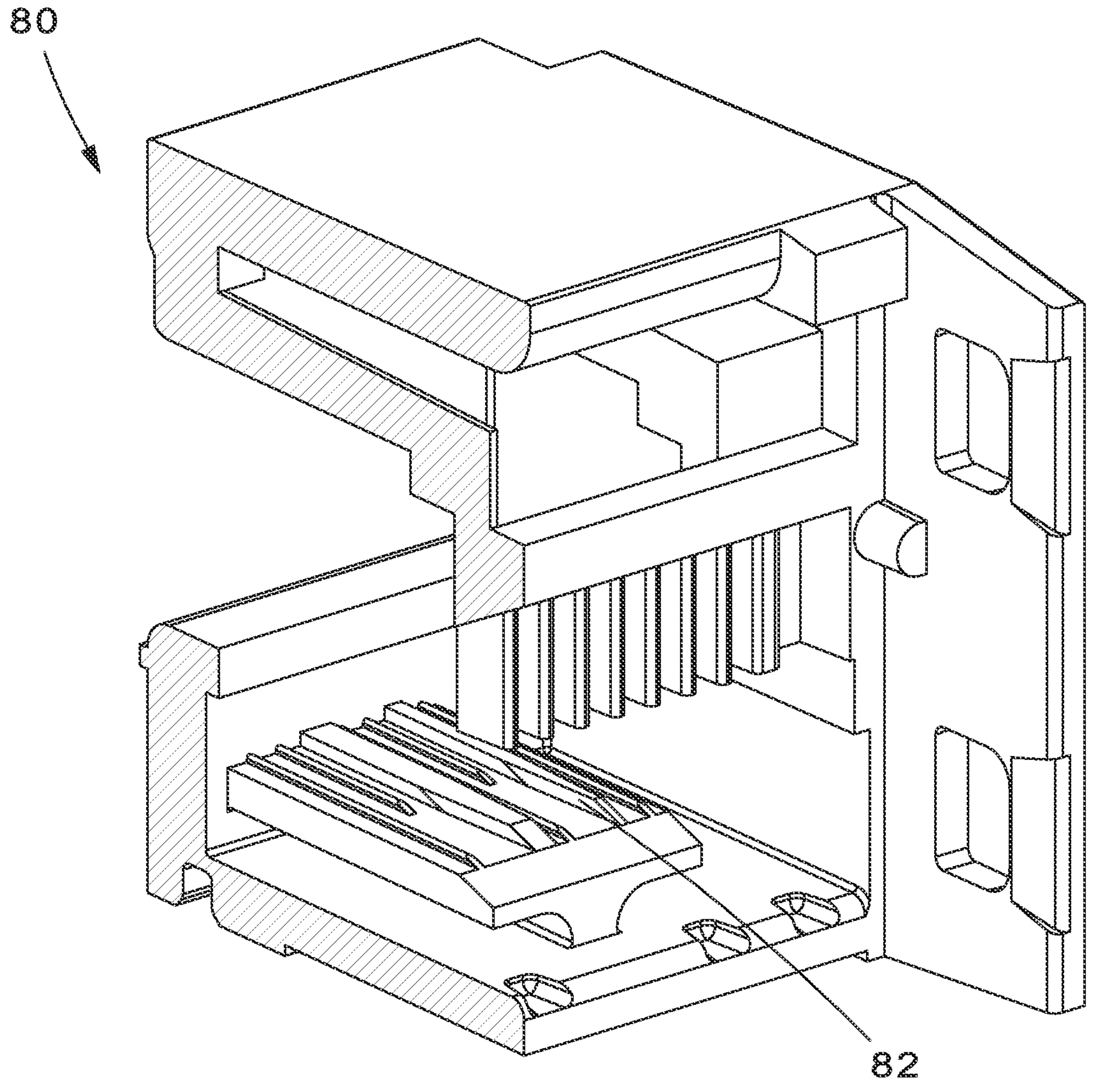
FIG. 10 shows an isometric cross-section view of a front housing according to an embodiment of the present invention.
Figure 11:
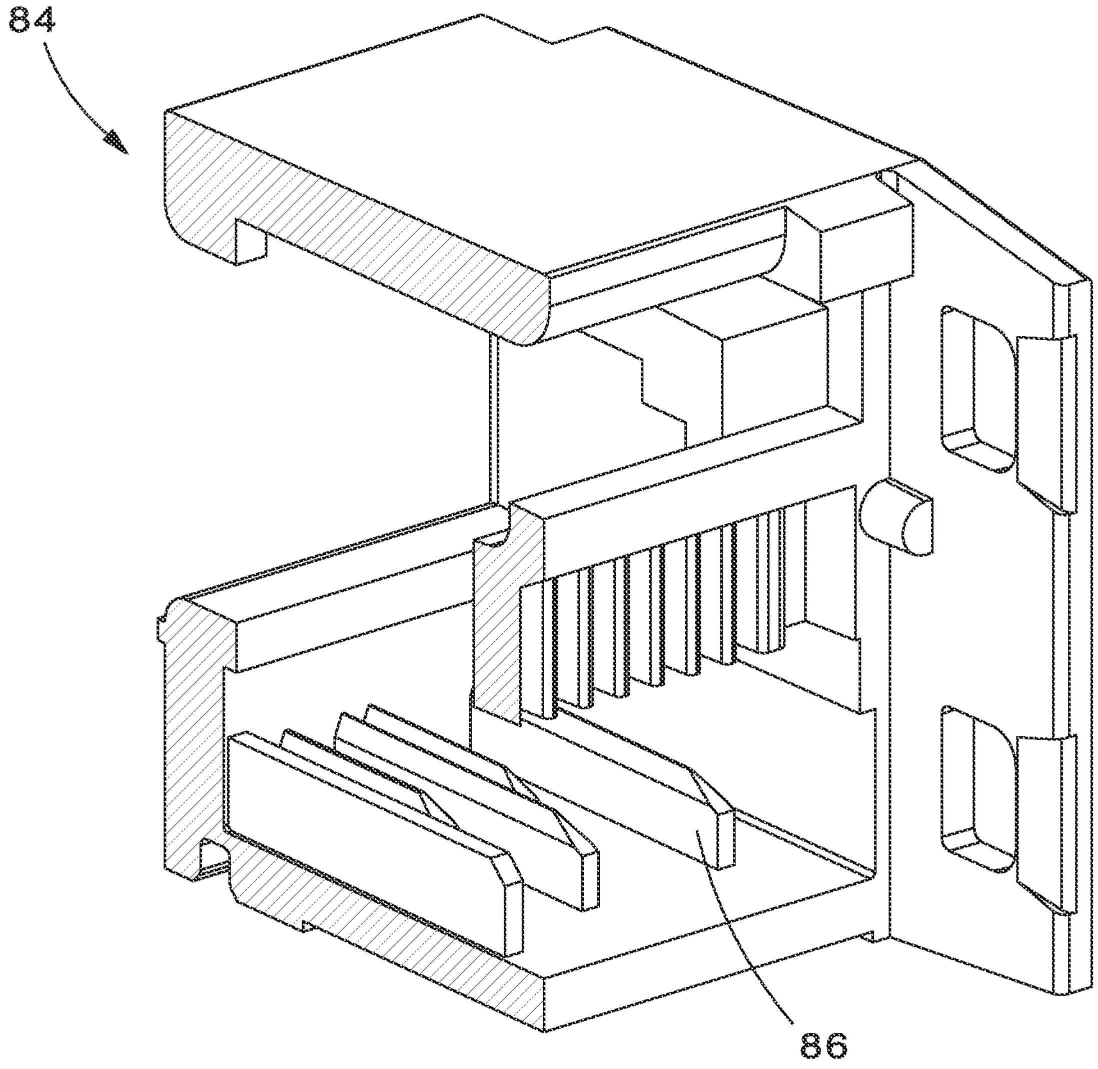
FIG. 11 shows an isometric cross-section view of a front housing according to an embodiment of the present invention.

FIG. 8 shows a rear bottom isometric view of front housing 32 and FIG. 9 shows an isometric cross-section view of front housing 32 taken about section line 9-9 in FIG. 8. During assembly of jack 20, PICs 36 move through housing combs 72 of front housing 32, which reduces risk of high potential dwell testing (Hipot) failure and increases repeatability of plug insertions. Additionally, crush ribs 74 of front housing 32 press against upper PIC layer 56 to reduce the amount of air between upper PIC layer 56, dielectric film 40, and lower PIC layer 58. Reducing the amount of air between the layers may allow for capacitance plates 66 to more accurately compensate the crosstalk in the jack in order to maintain specified electrical performance. Note that reducing the air gap between capacitance plates 66 may be achieved using many forms of biasing members in the housing. Alternate embodiments of front housings 80 and 84 with alternate crush ribs 82 and 86 are shown in FIGS. 10 and 11, respectively.

Figure 12:
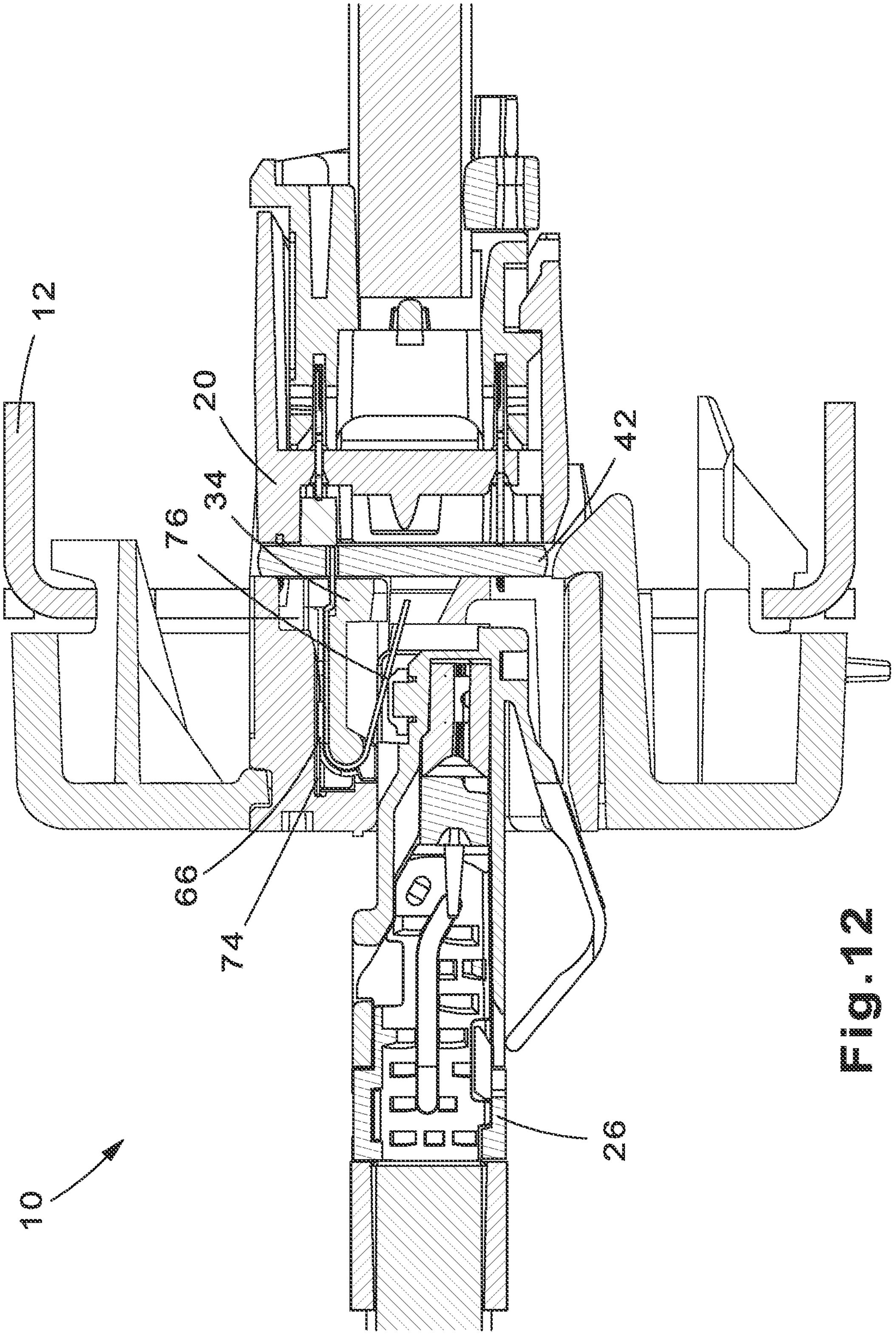
FIG. 12 is a cross-section view of the communication system of FIG. 1 taken about section line 12-12.

The interaction of plug 26 with jack 20 is shown in a cross-section view of FIG. 12 taken about section line 12-12 in FIG. 1. This view illustrates the plug/jack contact point 76 and its location relative to PCB 42 where additional crosstalk compensation circuitry may be implemented. By implementing the crossover sections 61 in combination with the capacitive circuitry comprising of plates 66 and dielectric film 40 relatively close to point 76, the overall crosstalk compensation requirements are simplified. This occurs because the distance where the offending crosstalk is generated in the PICs is reduced, because the phase delay between the plug/jack contact point 76 and the first stage of compensation is reduced, and because the compensation circuitry that may be positioned further than the PICs (e.g., on PCB 42) may potentially have a lower magnitude.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

We claim:

1. A communication jack for mating with a communication plug, said communication jack comprising:

a housing having an aperture for receiving said communication plug;

a plurality of plug interface contacts (PICs) wherein a portion of a first PIC of the plurality of PICs forms a first capacitor plate and a portion of a second PIC of the plurality of PICs forms a second capacitor plate;

a dielectric film separating the first PIC and capacitor plate from the second PIC and capacitor plate; and a sled positioned at least partially inside said housing, a first end of said sled being proximate said aperture and having a mandrel, a second end being distal said aperture.

* * * * *